(12) United States Patent
Touma (10) Patent No.: US 7,952,994 B2
(45) Date of Patent: May 31, 2011

(54) REDUNDANCY METHOD AND SWITCH APPARATUS

(75) Inventor: Eisaku Touma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 170 days.

(21) Appl. No.: 12/329,003

(22) Filed: Dec. 5, 2008

(65) Prior Publication Data

US 2009/0161563 A1 Jun. 25, 2009

(30) Foreign Application Priority Data

Dec. 19, 2007 (JP) ................................. 2007-327230

(51) Int. Cl.
*G06F 11/00* (2006.01)
(52) U.S. Cl. ......... 370/228; 370/235; 370/248; 370/401
(58) Field of Classification Search .................. None
See application file for complete search history.

(56) References Cited

U.S. PATENT DOCUMENTS

| | | | |
|---|---|---|---|
| 6,442,131 B1 * | 8/2002 | Kondo ........................... 370/218 |
| 7,359,331 B2 | 4/2008 | Takamichi | |
| 7,756,018 B2 * | 7/2010 | Tancevski et al. ............ 370/228 |
| 2004/0268175 A1 * | 12/2004 | Koch et al. ......................... 714/4 |
| 2006/0092856 A1 * | 5/2006 | Mitsumori ..................... 370/254 |
| 2007/0086333 A1 * | 4/2007 | Doukai et al. ................ 370/228 |
| 2008/0117912 A1 * | 5/2008 | He ................................. 370/392 |

FOREIGN PATENT DOCUMENTS

| | | |
|---|---|---|
| JP | 07-321810 | 12/1995 |
| JP | 2004-320683 | 11/2004 |

* cited by examiner

*Primary Examiner* — Chi H. Pham
*Assistant Examiner* — Shick Hom
(74) *Attorney, Agent, or Firm* — Staas & Halsey LLP (57) ABSTRACT

A redundancy method in which a network is made redundant with a working path and a protection path. The method includes transmitting a working system supervising frame and a protection system supervising frame from a switch apparatus on transmission side to the working path and the protection path; passing, by a switch apparatus on reception side, the working system supervising frame received from the working path as well as abolishing the protection system supervising frame and passing the protection system supervising frame received from the protection path as well as abolishing the working system supervising frame; and performing a connectivity check for the working path and the protection path by using the passed working system supervising frame and the passed protection system supervising frame.

7 Claims, 10 Drawing Sheets

FRAME BUFFER (WORKING) — 29a

| BUFFER# | SEQUENCE# | FRAME DATA |
|---|---|---|
| 1 | X | DA \| SA \| VLAN \| T/L \| DATA |
| 2 | X+1 | DA \| SA \| VLAN \| T/L \| DATA |
| ⋮ | ⋮ | ⋮ |
| 1000 | X+999 | DA \| SA \| VLAN \| T/L \| DATA |

FIG. 9B

FRAME BUFFER (PROTECTION) — 29b

| BUFFER# | SEQUENCE# | FRAME DATA |
|---|---|---|
| 1 | Y | DA \| SA \| VLAN \| T/L \| DATA |
| 2 | Y+1 | DA \| SA \| VLAN \| T/L \| DATA |
| ⋮ | ⋮ | ⋮ |
| 1000 | Y+999 | DA \| SA \| VLAN \| T/L \| DATA |

FIG. 10

REDUNDANCY METHOD AND SWITCH APPARATUS

CROSS-REFERENCE TO RELATED APPLICATIONS

This application is based upon and claims the benefit of priority of the prior Japanese Patent Application No. 2007-327230, filed on Dec. 19, 2007, the entire contents of which are incorporated herein by reference.

BACKGROUND

Field

The following two methods have heretofore been generally employed as link redundancy methods in packet networks such as "Ethernet" (registered trademark):

The first method is a link aggregation (LAG) scheme. In the link aggregation scheme, frames are allocated to a plurality of physical interfaces on the basis of the information of MAC addresses or IP addresses on a transmission side in an ordinary mode, and signals from the plurality of physical interfaces are synthesized on a reception side. In an abnormal mode of any of the physical interfaces, the physical interface having undergone an abnormality is excluded from the allocation, and a protection is applied thereby.

Figure 1:
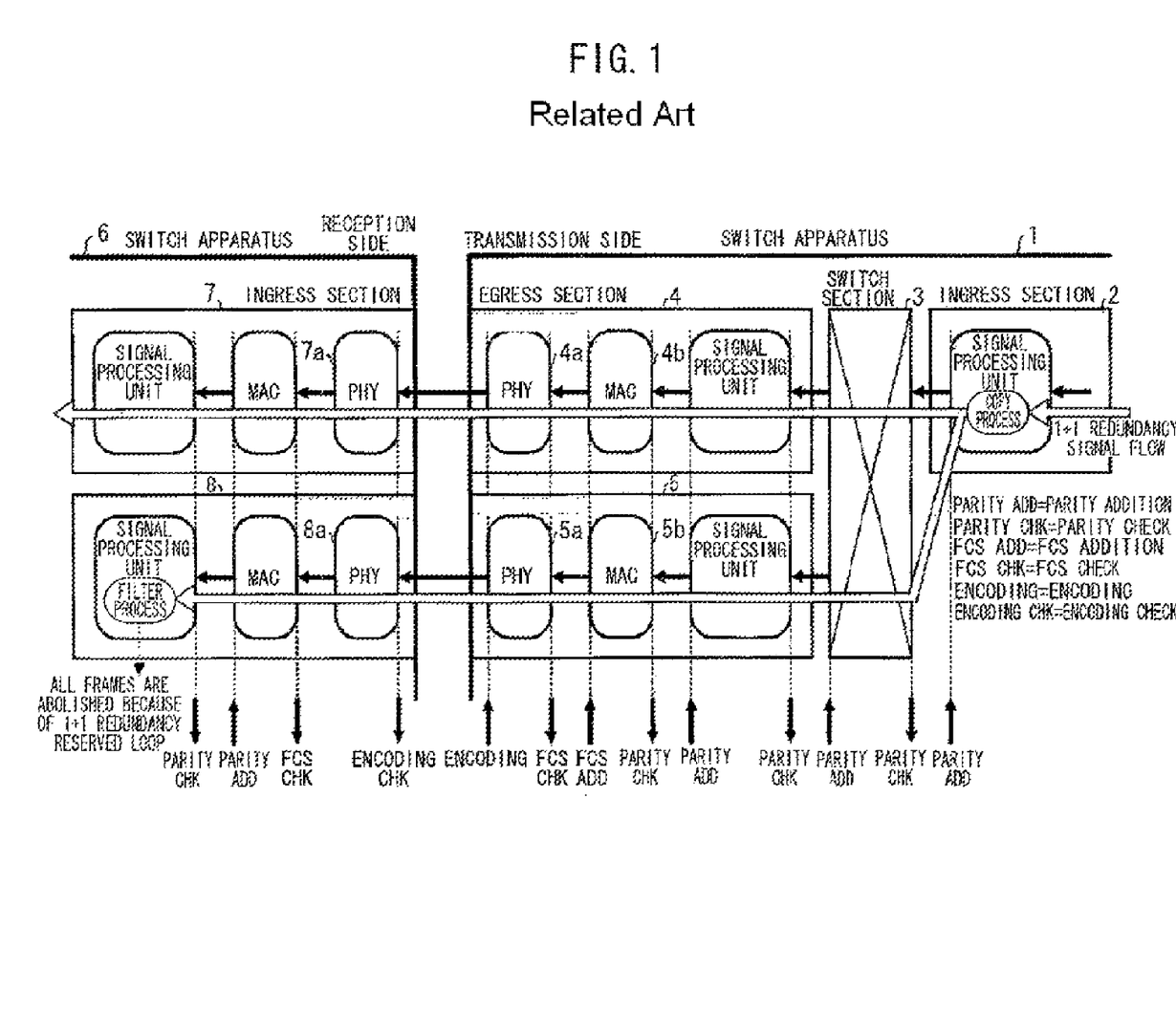
FIG. 1 is a diagram for explaining a 1+1 switching scheme in the related art.

The second method is a 1+1 switching scheme. In the 1+1 switching scheme, as shown in FIG. 1, each of the frames is duplicated by an ingress section 2 in a transmission-side switch apparatus 1. One of the duplicate frames is transmitted from each of the respective physical interfaces 4a and 5a of egress sections 4 and 5 (working and protection) through a switch section 3, and received by the respective physical interfaces 7a and 8a of two ingress sections 7 and 8 in a reception-side switch apparatus 6. Of the two received frames, only the frame received by the working ingress section 7 is selected and used, while the frame received by the protection ingress section 8 is abolished. If an error occurs in the working ingress section, the protection ingress section is selected to process the frame, that is, so-called 1+1 redundant switching.

The LAG scheme needs to recompute a traffic allocation method. In contrast, the 1+1 switching scheme may implement a simple switching logic at the occurrence of any abnormality. Hence, the 1+1 switching scheme has the advantage that fast switching (<50 ms, or so) is possible.

Meanwhile, the LinkDown or LoS (Loss of Light) of a physical interface, or the error detection of the FCS (Frame Check Sequence) of frames has been generally employed to confirm a reception traffic abnormality, which is the switching trigger of the LAG scheme or the 1+1 switching scheme.

Incidentally, Japanese Laid-open Patent Publication No. 2004-320683 discloses a capsule that reports any fault detected in a client circuit. The capsule is included in the network of "Wide Area Ethernet" (registered trademark). A frame is sent out with an FCS field that indicates whether or not the capsule is normal, while on the other hand, the abnormal state of a transmission medium network layer is detected by receiving the information.

Besides, Japanese Laid-open Patent Publication No. 07-321810 discloses that the same numbers of sequence numbers are added in a working sequence number addition unit and a protection sequence number addition unit. The normality of the numbers is confirmed so as to detect the loss of any cell or the sequence reversal of cells.

SUMMARY

According to an aspect of the invention, a redundancy method in which a network is made redundant with a working path and a protection path includes transmitting a working supervising frame and a protection supervising frame from a switch apparatus on a transmission side to the working path and the protection path; passing, by a switch apparatus on a reception side, the working supervising frame received from the working path as well as abolishing the protection supervising frame and passing the protection supervising frame received from the protection path as well as abolishing the working supervising frame; and performing a connectivity check for the working path and the protection path by using the passed working supervising frame and the passed protection supervising frame.

The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION OF THE PREFERRED EMBODIMENTS

Reference may now be made in detail to embodiments of the present invention, examples of which are illustrated in the accompanying drawings, wherein like reference numerals refer to like elements throughout.

Figure 2A:
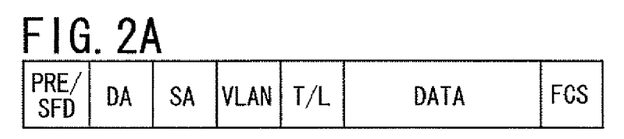
FIGS. 2A to 2C are diagrams for explaining a transmission frame, a frame within an apparatus, and a parity check.
Figure 2B:
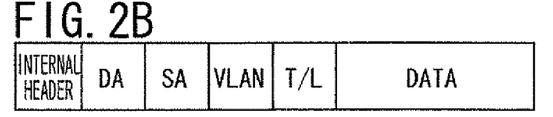

In the present-day 1+1 switching scheme (refer to FIG. 1), the FCS of a transmission frame shown in FIG. 2A is recomputed in MAC processing units 4b and 5b at the preceding stages of the respective physical interfaces 4a and 5a. The FCS is added into a frame within the apparatus as shown in FIG. 2B. By the way, in FIGS. 2A and 2B, "Pre/SFD" is short for Preamble/SFD (Start of Frame Delimiter). "DA" is short for Destination Address, and "SA" for Source Address. "VLAN" is a VLAN (Virtual LAN: virtual network) tag which is stipulated in IEEE 802.1q, and which contains VLAN_ID (virtual network identifier). "T/L" indicates Type or Length, "Data" are Layer 3 Data, and "FCS" is short for Frame Check Sequence. Besides, an "internal header" is internal management information such as switch route information, and it is added in the switch apparatus.

Figure 2C:
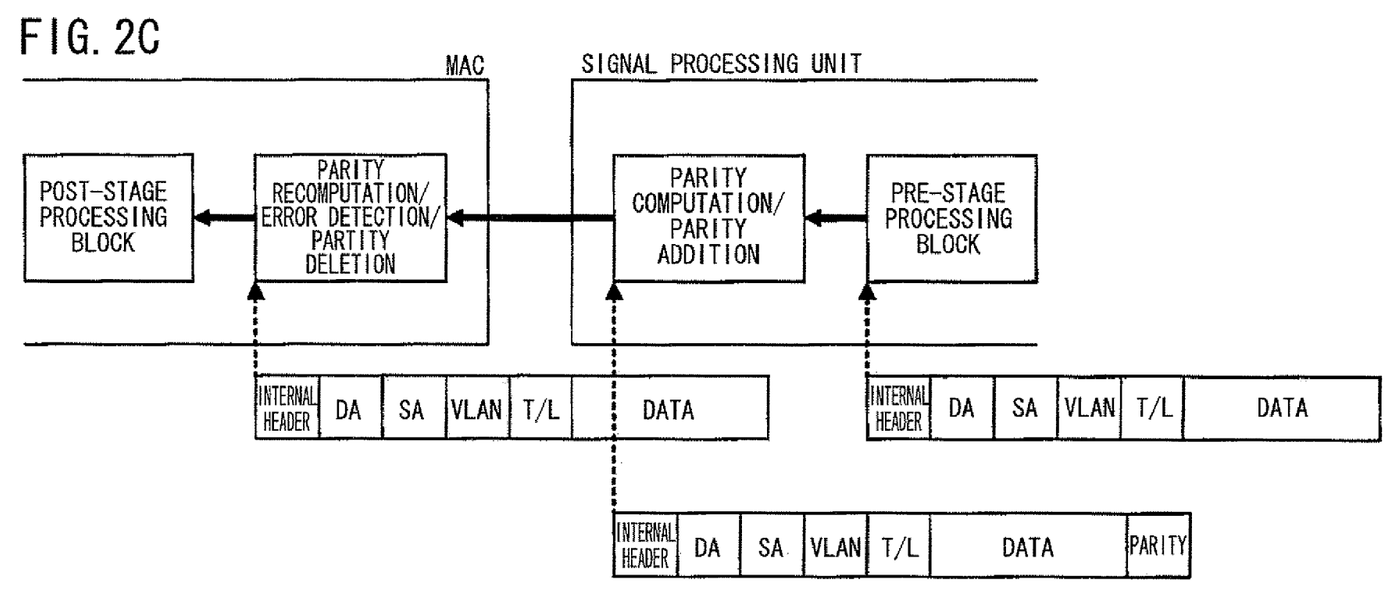

Block sections in the apparatus are supervised by a parity addition and a parity check as shown in FIG. 2C. The abnormality of any of the sections is detected as an apparatus fault. Incidentally, a parity is computed in a range from the internal header to the data.

Figure 3:
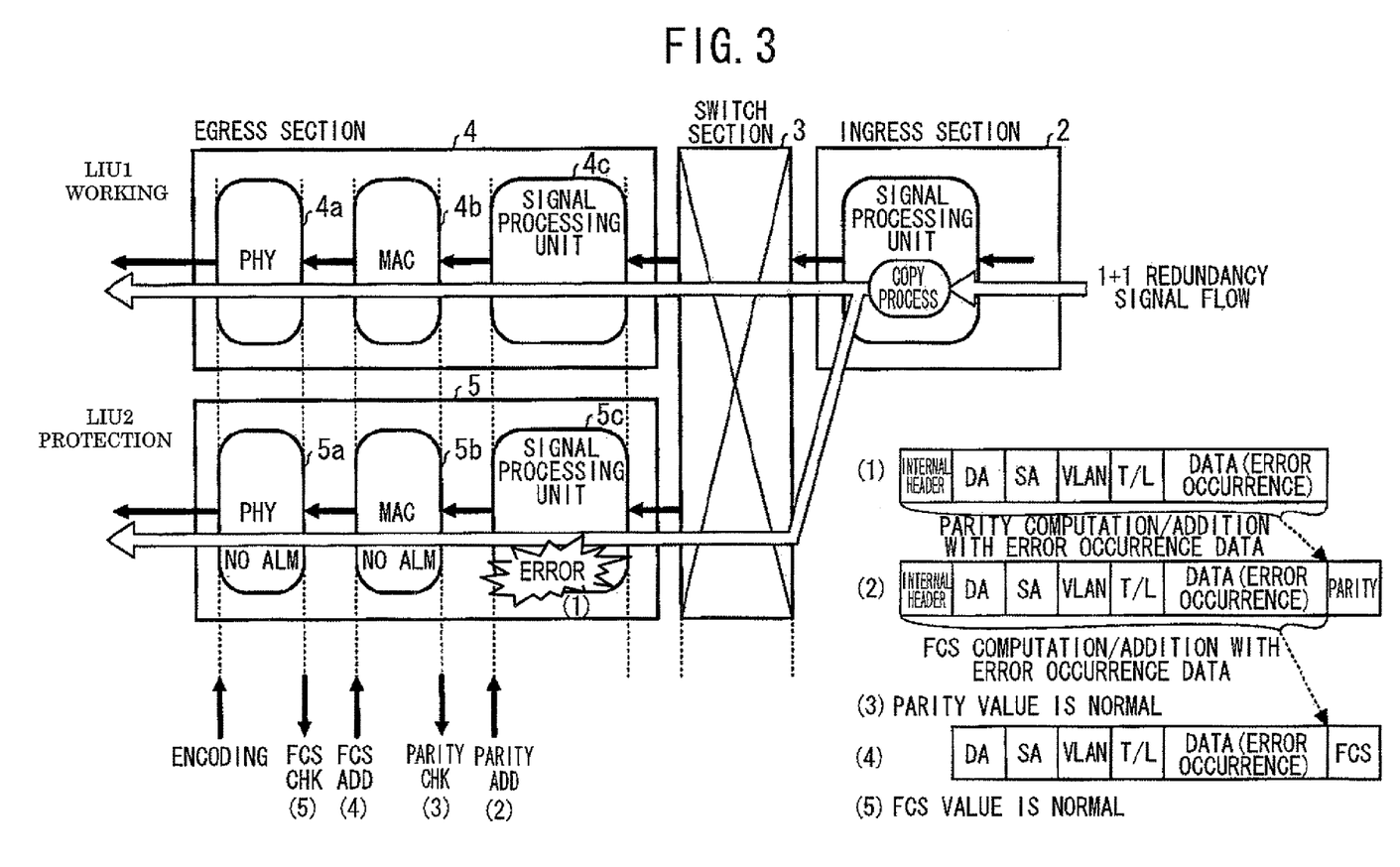
FIG. 3 is a diagram for explaining a silent alarm.

However, in a case, for example, where any abnormality exists in a signal processing unit $5c$ at the preceding stage of the MAC processing unit $5b$ as shown in FIG. 3, a normal parity is added to a frame on the egress side of the signal processing unit $5c$, and a normal FCS is added in the MAC processing unit $5b$, so that the apparatus cannot detect the error state by itself. Besides, in the 1+1 redundancy system, an FCS check for the reception-side reserved loop of the opposing switch apparatus 6 becomes normal. Accordingly, notwithstanding that the abnormality of the reserved loop has occurred, there arises a silent alarm state where the abnormality is not reported to a maintenance engineer.

By the way, in the LAG scheme, an actual traffic is allocated to physical interfaces, and hence, a complete silent alarm state does not arise.

In a case where any abnormality has occurred in the working system in the silent alarm state, there has been the problem that, even when the working system is switched to the protection system as the result of a switching operation, traffic turns down because of the silent alarm.

The present invention has been made in view of the above drawback, and it has for its object to provide a redundancy method and a switch apparatus which can prevent the occurrence of the silent alarm state of a reserved loop in a 1+1 switching scheme.

Now, embodiments of the invention will be described in conjunction with the drawings.

(1) 1+1 Both System Reception

Supervising VLAN frames are set respectively for a working system and a protection system. The values of concrete VLAN_IDs are set by an operator. The configuration of a 1+1 transmission side is the same as in the related art. On a reception side, although all frames have heretofore been subjected to an abolishment process in the protection system, a protection supervising VLAN is passed, and the passed protection supervising VLAN is transferred to a processing unit at a succeeding stage. Connectivity checks are performed between the apparatuses for the working system and the protection system, by using pings which have the supervising VLAN_IDs respectively for the working system and the protection system, whereby the occurrence of any abnormality in the respective communications of the working system and the protection system is detected, and a silent alarm state can be avoided.

(2) Frame Comparison

On the 1+1 transmission side, a sequence number is added to each frame, and a 1+1 frame copy process is executed. On the reception side of 1+1 redundancy, the respective reception frames of the working system and the protection system are extracted and buffered. Frames of the same sequence numbers in the respective buffers of the working system and the protection system are compared, whereby the occurrence of any abnormality of the communication of either of the working system and the protection system is detected.

At least either of the above operations (1) and (2) is employed, whereby the respective signals of the working system and the protection system in 1+1 redundancy sections are supervised, and a silent alarm state in the 1+1 redundancy is avoided.

Now, a case where the invention is applied to a chassis type layer-2 switch apparatus will be described by way of example. In a chassis type layer-2 switch, individual physical interfaces are dividedly installed on LIUs (Line Interface Units).

First Embodiment: 1+1 Both System Reception

Figure 4:
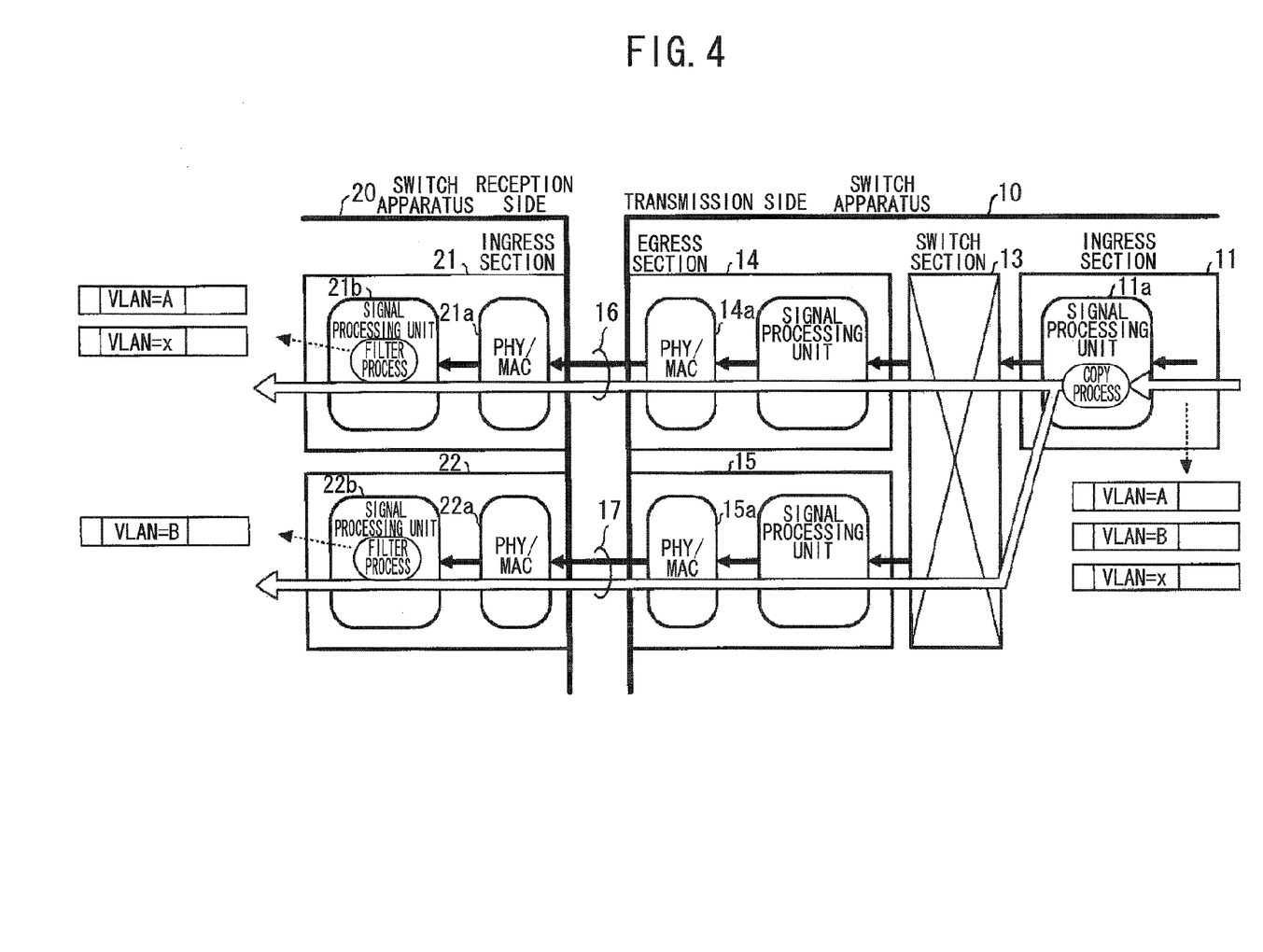
FIG. 4 is a diagram showing the configuration of a first embodiment in the normal mode thereof.
Figure 5:
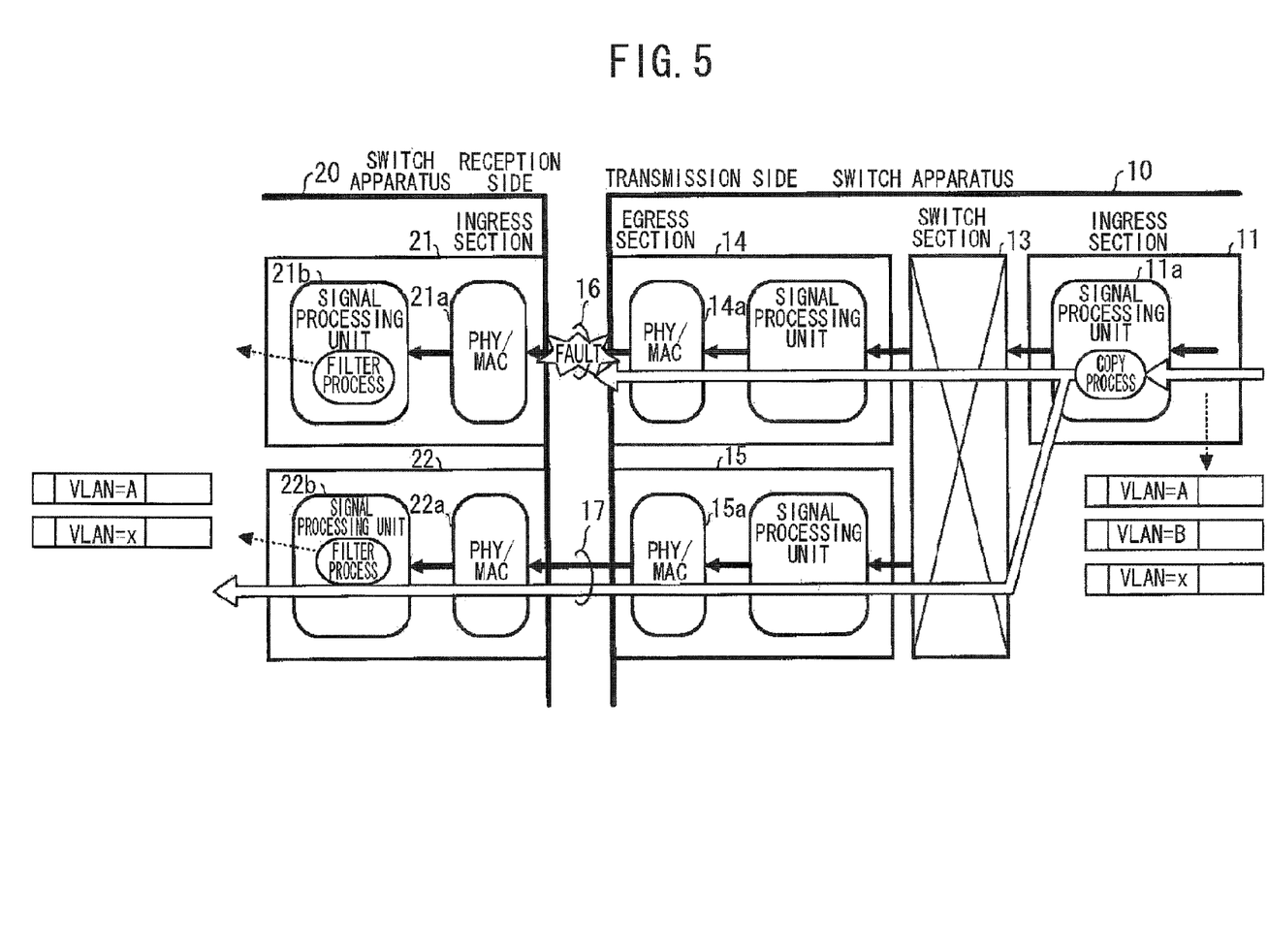
FIG. 5 is a diagram showing the configuration of the first embodiment in the abnormal mode thereof.

FIGS. 4 and 5 show configurational diagrams of the first embodiment of the method of the invention.

FIG. 4 is the configurational diagram for explaining a normal mode. Referring to FIG. 4, the signal processing unit $11a$ of an ingress section 11 in a switch apparatus 10 of transmission side is fed with an intra-apparatus frame for supervising a working system (parts) that has VLAN_ID=A in a format shown in FIG. 2B, an intra-apparatus frame for supervising a protection system (parts) that has VLAN_ID=B, and an intra-apparatus frame for a general signal (a main signal, or the like) that has VLAN_ID=x (x being a value different from the values A and B). By the way, in FIGS. 4, 5 and 6, "VLAN_ID" is contained in VLAN and is therefore written as "VLAN".

The signal processing unit $11a$ copies these frames and then feeds them to a switch section 13. On this occasion, switch route information indicating the route of the working system is added to the internal header of each intra-apparatus frame of a copy source. In addition, switch route information indicating the route of the protection system is added to the internal header of each intra-apparatus frame having been copied.

The switch section 13 implements switching in accordance with the internal headers added to the intra-apparatus frames. The switch section 13 feeds the intra-apparatus frames of the copy sources (VLAN_ID=A, B and x) to a working egress section 14, and the intra-apparatus frames having been copied (VLAN_ID=A, B and x) to a protection egress section 15.

In addition, the physical interface $14a$ of the working egress section 14 converts the intra-apparatus frames of the working system into transmission frames. The physical interface $14a$ transmits the transmission frames from a circuit (path) 16 to the working ingress section 21 of a switch apparatus 20 of reception side. The physical interface $15a$ of the protection egress section 15 converts the intra-apparatus frames of the protection system into transmission frames. The physical interface $15a$ transmits the transmission frames from a circuit (path) 17 to the protection ingress section 22 of the switch apparatus 20 of the reception side.

A physical interface $21a$ converts the received transmission frames of the working system into the intra-apparatus frames of the working system in the working ingress section 21 of the switch apparatus 20 on the reception side. The physical interface $21a$ feeds the intra-apparatus frames to a signal processing unit $21b$. The signal processing unit $21b$ passes the intra-apparatus frame for supervising the working system that has the VLAN_ID=A, and the intra-apparatus frame of the general signal that has the VLAN_ID=x, so as to feed the passed frames to a succeeding circuit. The signal processing unit $21b$ executes a filter process for abolishing the intra-apparatus frame for supervising the protection system that has the VLAN_ID=B.

A physical interface $22a$ converts the received transmission frames of the protection system into the intra-apparatus frames of the protection system in the protection ingress section 22 of the switch apparatus 20 on the reception side. The physical interface $22a$ feeds the intra-apparatus frames to a signal processing unit 22b. The signal processing unit 22b passes the intra-apparatus frame for supervising the protection system that has the VLAN_ID=B, so as to feed the passed intra-apparatus frame to a succeeding circuit. The signal processing unit 22b executes a filter process for abolishing the intra-apparatus frame for supervising the working system that has the VLAN_ID=A, and the intra-apparatus frame for the general signal that has the VLAN_ID=x.

More specifically, the intra-apparatus frame having the VLAN_ID=A is detected in the signal processing unit 21b, whereby the existence or nonexistence of any fault in the working system can be detected. Besides, the intra-apparatus frame having the VLAN_ID=B is detected in the signal processing unit 22b, whereby the existence or nonexistence of any fault in the protection system can be detected. In this manner, the occurrence of a silent alarm state can be avoided.

FIG. 5 is a configurational diagram for explaining an abnormal mode. In a case where the working circuit 16 between the switch apparatuses 10 and 20 has undergone any fault, the filtering conditions of the signal processing units 21b and 22b are switched in order to implement a protection operation.

The filtering condition of the signal processing unit 21b, which was the working system before switching, becomes the filtering condition of the signal processing unit 22b, which was the protection system before switching (passing the intra-apparatus frames of the VLAN_ID=A and x). In addition, the signal processing unit 22b, which was the protection system before switching operates with its filtering condition replaced with the filtering condition of the signal processing unit 21b, which was the working system before switching (extraction of the intra-apparatus frame of the VLAN_ID=B). In this case, the intra-apparatus frame for supervising the protection system that has the VLAN_ID=B falls into a disconnected state on account of the circuit disconnection. However, the intra-apparatus frame of the VLAN_ID=B is connected simultaneously with the restoration of the circuit between the switch apparatuses 10 and 20, whereby the restoration check of the protection system can be performed.

Figure 6:
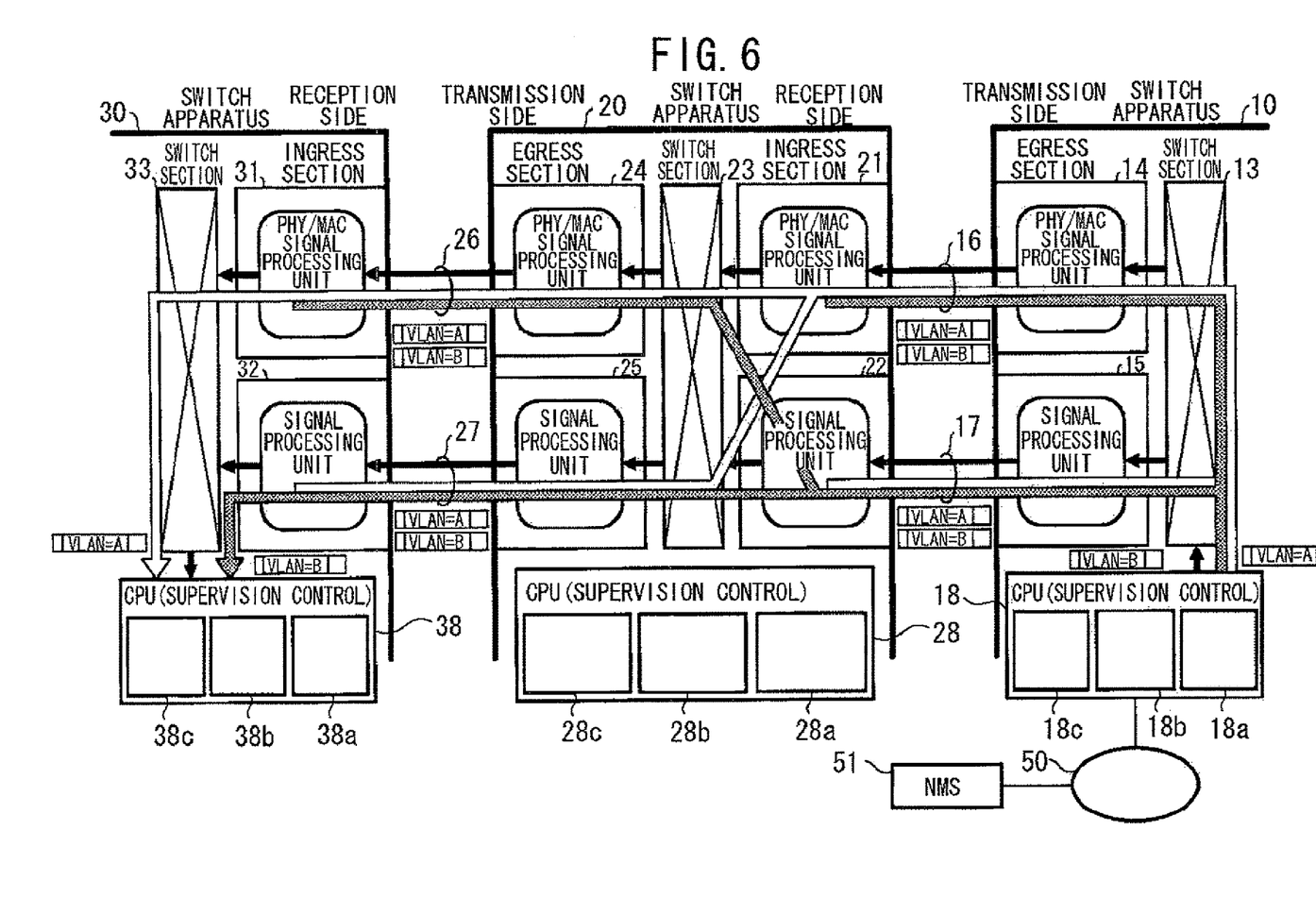
FIG. 6 is a diagram showing the configuration of the first embodiment for performing a connectivity check based on a ping.

FIG. 6 shows a diagram of a configuration in which connectivity checks based on pings are performed using the working system supervising intra-apparatus frame of the VLAN_ID=A and the protection system supervising intra-apparatus frame of the VLAN_ID=B.

Referring to FIG. 6, the CPU (supervision control unit) 18 of a switch apparatus 10 performs the switching control and supervision control of this switch apparatus. The CPU 18 includes a frame transmission/reception function portion 18a which performs transmission/reception by inserting a ping frame into a main signal band. Further, the CPU 18 includes a filter condition setting function portion 18b which sets a filter condition in the signal processing unit of an ingress section, not shown, and an alarm function portion 18c which issues an alarm and then sends out the alarm to a supervision network 50.

Likewise, the respective CPUs (supervision control units) 28 and 38 of switch apparatuses 20 and 30 include frame transmission/reception function portions 28a and 38a, filter condition setting function portions 28b and 38b, and alarm function portions 28c and 38c. In this embodiment, however, it suffices to dispose, at least, the frame transmission/reception function portions 18a and 38a, the filter condition setting function portions 28b and 38b, and the alarm function portion 18c.

The frame transmission/reception function portion 18a of the switch apparatus 10 generates the respective ping frames of the VLAN_IDs=A and B. The frame transmission/reception function portion 18a transmits the ping frames to the frame transmission/reception function portion 38a of the switch apparatus 30. In addition, the frame transmission/reception function portion 38a of the switch apparatus 30 receives the respective ping response frames of the VLAN_IDs=A and B as transmitted from the frame transmission/reception function portion 38a of the switch apparatus 30. Thus, the respective ping connectivity checks of the working system and the protection system are performed. When the ping connectivity checks are impossible, the alarm function portion 18c is notified to that effect. When the alarm function portion 18c receives the notification to the effect that the respective ping connectivity checks of the working system and the protection system are impossible, the alarm function portion 18c generates the respective alarms of the working system and the protection system and notifies the alarms to an NMS (Network Management System) 51 via the supervision network 50. Thus, the alarms are reported to a maintenance engineer.

The filter condition setting function portions 28b and 38b of the switch apparatuses 20 and 30 control the settings and switching of the filtering conditions of ingress sections 21, 31, 22 and 32.

Here, the ping frame of the VLAN_ID=A which has been generated by the frame transmission/reception function portion 18a of the CPU (supervision control unit) 18 of the switch apparatus 10 and which has been transmitted from the CPU (supervision control unit) 18 is led to the CPU (supervision control unit) 38 of the switch apparatus 30. The ping frame of the VLAN_ID=A is led by a path which extends along a switch section 13, an egress section 14, a circuit 16, the ingress section 21 of the switch apparatus 20, a switch section 23, an egress section 24, a circuit 26, the ingress section 31 of the switch apparatus 30, and a switch section 33.

The ping response frame of the VLAN_ID=A which responds to the received ping frame of the VLAN_ID=A is generated in the frame transmission/reception function portion 38a of the CPU (supervision control unit) 38 of the switch apparatus 30. In addition, the ping response frame is transmitted to the frame transmission/reception function portion 18a of the CPU (supervision control unit) 18 of the switch apparatus 10 by a path which is reverse to the above path. The ping connectivity check is periodically performed, whereby the normality of the working system can be confirmed.

Here, the ping frame of the VLAN_ID=A which has been transmitted from the CPU (supervision control unit) 18 is led to the ingress section 22 of the switch apparatus 20 by a path which extends along the switch section 13, an egress section 15 and a circuit 17, and it is abolished in this ingress section 22. Likewise, the ping frame of the VLAN_ID=A which has been copied in the ingress section 21 is led to the switch section 23, an egress section 25, a circuit 27, and the ingress section 32 of the switch apparatus 30, and it is abolished in this ingress section 32.

On the other hand, the ping frame of the VLAN_ID=B which has been generated by the frame transmission/reception function portion 18a of the CPU (supervision control unit) 18 of the switch apparatus 10 and which has been transmitted from the CPU (supervision control unit) 18 is led to the CPU (supervision control unit) 38 of the switch apparatus 30. The ping frame of the VLAN_ID=B is led by a path which extends along the switch section 13, the egress section 15, the circuit 17, the ingress section 22 of the switch apparatus 20, the switch section 23, the egress section 25, the circuit 27, the ingress section 32 of the switch apparatus 30, and the switch section 33.

The ping response frame of the VLAN_ID=B which responds to the received ping frame of the VLAN_ID=B is generated in the frame transmission/reception function portion 38a of the CPU (supervision control unit) 38 of the switch apparatus 30. In addition, the ping response frame is transmitted to the frame transmission/reception function portion 18a of the CPU (supervision control unit) 18 of the switch apparatus 10 by a path which is reverse to the above path. The ping connectivity check is periodically performed, whereby the normality of the protection system can be confirmed.

Incidentally, the ping frame of the VLAN_ID=B which has been transmitted from the CPU (supervision control unit) 18 is led to the ingress section 21 of the switch apparatus 20 by a path which extends along the switch section 13, the egress section 14, and the circuit 16, and it is abolished in this ingress section 21. Likewise, the ping frame of the VLAN_ID=B which has been copied in the ingress section 22 is led to the switch section 23, the egress section 24, and the ingress section 31 of the switch apparatus 30, and it is abolished in this ingress section 31.

Incidentally, the flow of the intra-apparatus frame of the general signal (the main signal, or the like) as has the VLAN_ID=x (x being the value different from the values A and B) is the same as described with reference to FIG. 4.

Second Embodiment: Frame Comparison

Figure 7:
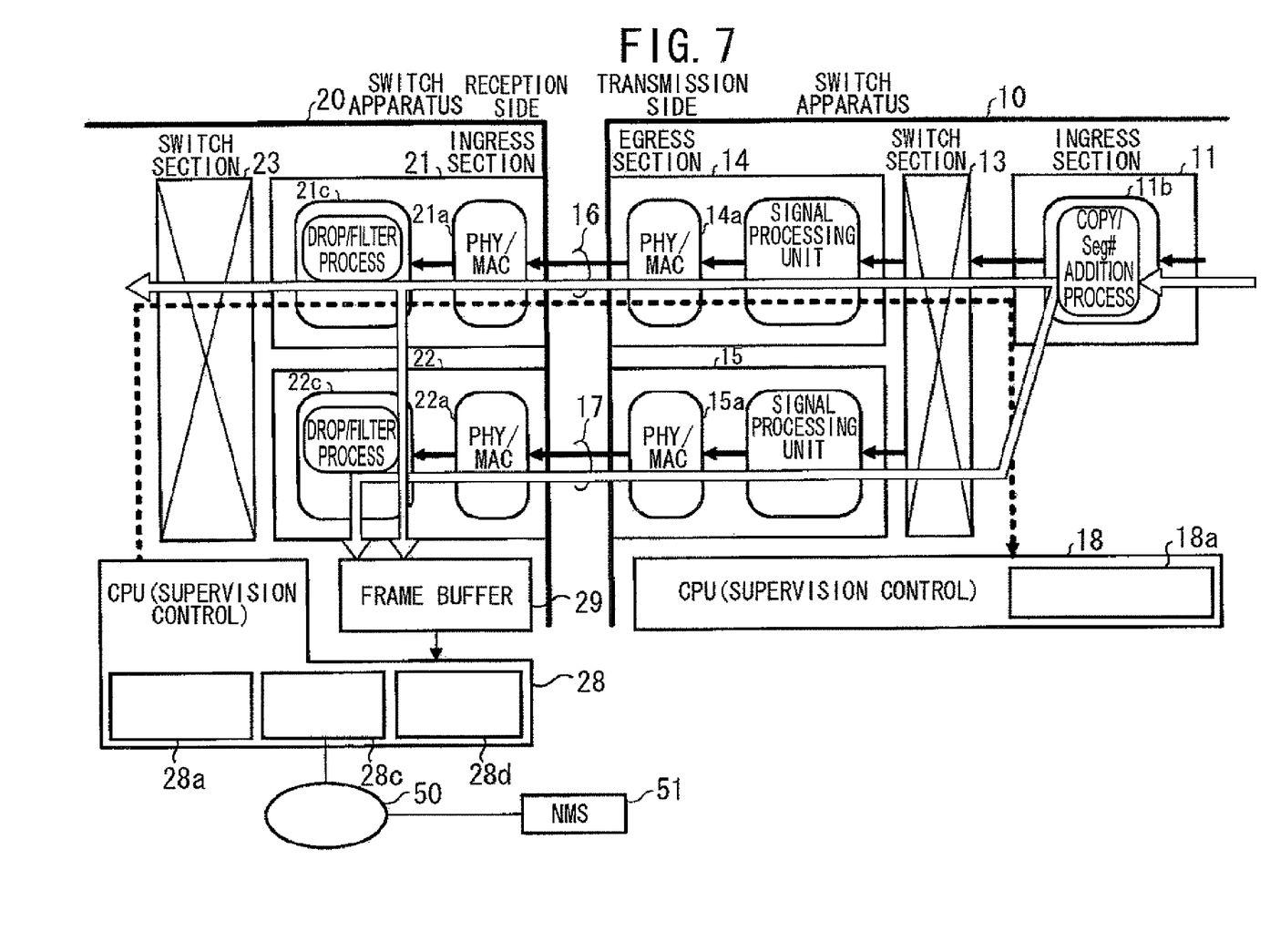
FIG. 7 is a diagram showing the configuration of a second embodiment.

FIG. 7 shows a configurational diagram of the second embodiment of the method of the invention. Referring to FIG. 7, the signal processing unit 11b of an ingress section 11 in a switch apparatus 10 of transmission side is fed with the intra-apparatus frame of a general signal (a main signal, or the like) as has a VLAN_ID=x (x being any of all values).

The signal processing unit 11b adds a sequence number (Seq#) to the frame, it copies the frame, and it feeds the resulting frames to a switch section 13. This signal processing unit 11b adds the sequence number from an initial value of zero by incrementing the number by one each time the frame is fed. Besides, switch route information indicating the route of a working system is added to the internal header of the intra-apparatus frame being a copy source. Switch route information indicating the route of a protection system is added to the internal header of the intra-apparatus frame having been copied.

Figure 8A:
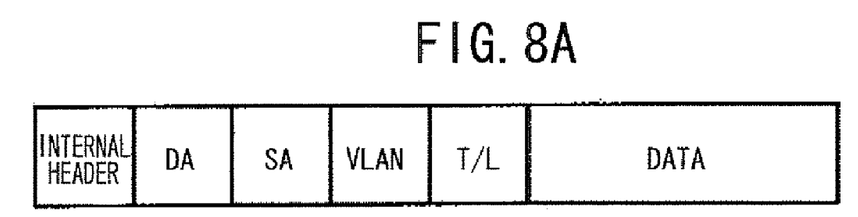
FIGS. 8A and 8B are diagrams for explaining the second embodiment.
Figure 8B:
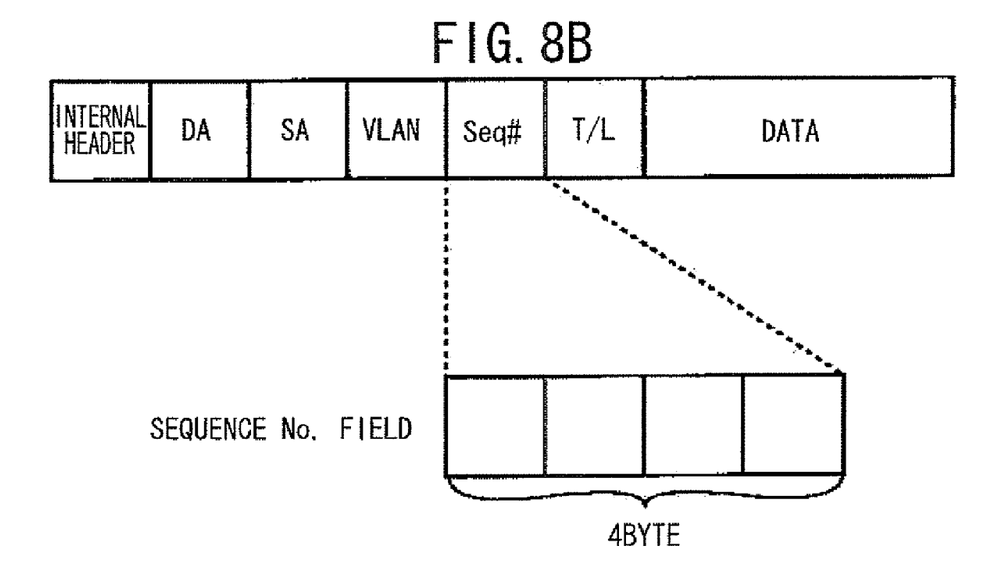

The addition of the sequence number to the intra-apparatus frame will be described with reference to FIGS. 8A and 8B. The sequence number is initialized (reset to zero) by the start or reset of the switch apparatus 10 on the transmission side, or the return of a physical interface from the LinkDown thereof. The sequence number incremented each time the intra-apparatus frame is fed, is added to an intra-apparatus frame shown in FIG. 8A, in order to obtain an intra-apparatus frame shown in FIG. 8B. A field length for avoiding counter-over is ensured for the sequence number The intra-apparatus frame is shown with a 32-bit length in FIG. 8B, but it may well be enlarged to a 64-bit length or the like if necessary.

The switch section 13 performs switching in accordance with the internal headers added to the intra-apparatus frames, in order to feed the intra-apparatus frame of the copy source to a working egress section 14 and to feed the intra-apparatus frame having been copied, to a protection egress section 15.

In addition, the physical interface 14a of the working egress section 14 converts the intra-apparatus frame of the working system into a transmission frame. The physical interface 14a transmits the transmission frame from a circuit 16 to the working ingress section 21 of a switch apparatus 20 of reception side. Besides, the physical interface 15a of the protection egress section 15 converts the intra-apparatus frame of the protection system into a transmission frame. The physical interface 15a transmits the transmission frame from a circuit 17 to the protection ingress section 22 of the switch apparatus 20 on the reception side.

The physical interface 21a converts the received transmission frame of the working system into an intra-apparatus frame of the working system in the working ingress section 21 of the switch apparatus 20 on the reception side, and feeds the intra-apparatus frame to a signal processing unit 21c. The signal processing unit 21c sends the received intra-apparatus frame to a frame buffer 29 as well as deletes only the sequence number from the received intra-apparatus frame and transmits the intra-apparatus frame to the switch section 23.

Meanwhile, in the protection ingress section 21 of the switch apparatus 20 on the reception side, the physical interface 22a converts the received transmission frame of the protection system into an intra-apparatus frame of the protection system and feeds the intra-apparatus frame to a signal processing unit 22c. The signal processing unit 22c sends the received intra-apparatus frame to the frame buffer 29 but not transmits the intra-apparatus frame to the switch section 23 and abolishes it.

The CPU (supervision control unit) 28 of the switch apparatus 20 includes the frame transmission/reception function portion 28a, the alarm function portion 28c, and a comparison function portion 28d. Likewise, the CPU (supervision control unit) 18 of the switch apparatus 10 includes the frame transmission/reception function portion 18a, the alarm function portion 18c, a comparison function portion 18d, and a frame buffer 19. In this embodiment, however, it suffices that the CPU (supervision control unit) 18 includes at least the frame transmission/reception function portion 18a.

Figure 9A:
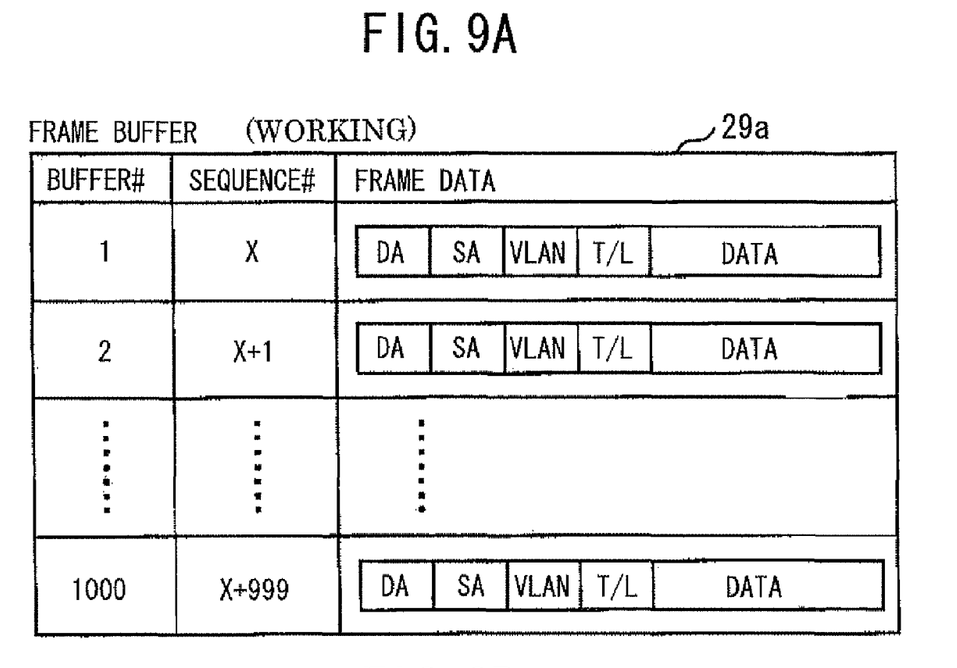
FIGS. 9A and 9B are diagrams showing the configuration of a frame buffer 29 in the second embodiment.
Figure 9B:
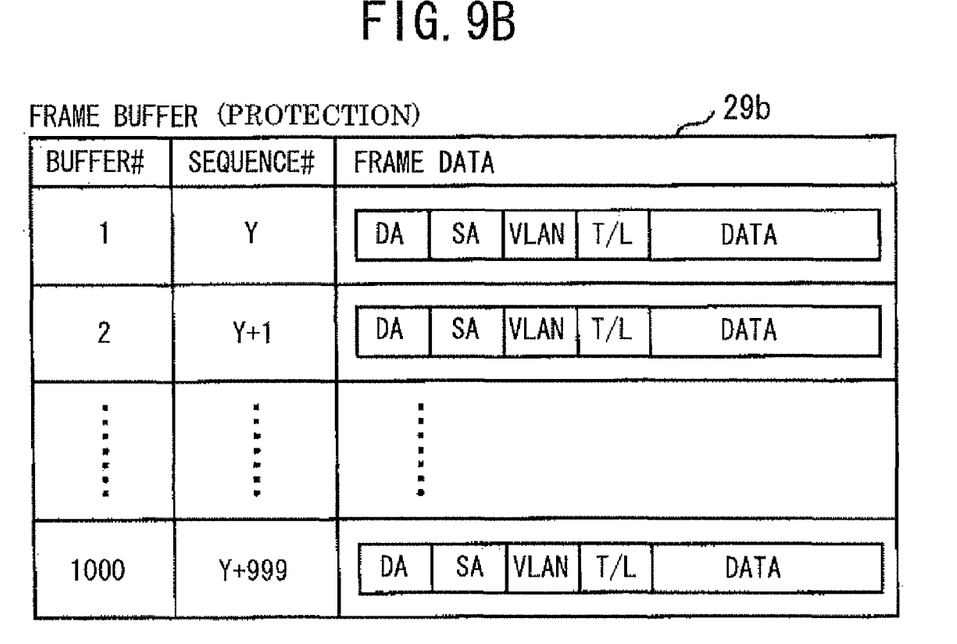

FIGS. 9A and 9B show a configuration of the frame buffer 29. The frame buffer 29 includes a working frame buffer 29a and a protection frame buffer 29b. The frame buffer 29a shown in FIG. 9A stores an intra-apparatus frame of the working system, while the frame buffer 29b shown in FIG. 9B stores an intra-apparatus frame of the protection system.

Each of the frame buffers 29a and 29b can store reception frame data as it is for a plurality of frames and holds the buffer number and the sequence number added to the received frame as indexes. Although the capacity of buffer is shown as 1000 frames, the capacity of buffer is determined on the basis of the phase difference (time difference) between reception frames in the working system and the protection system.

Figure 10:
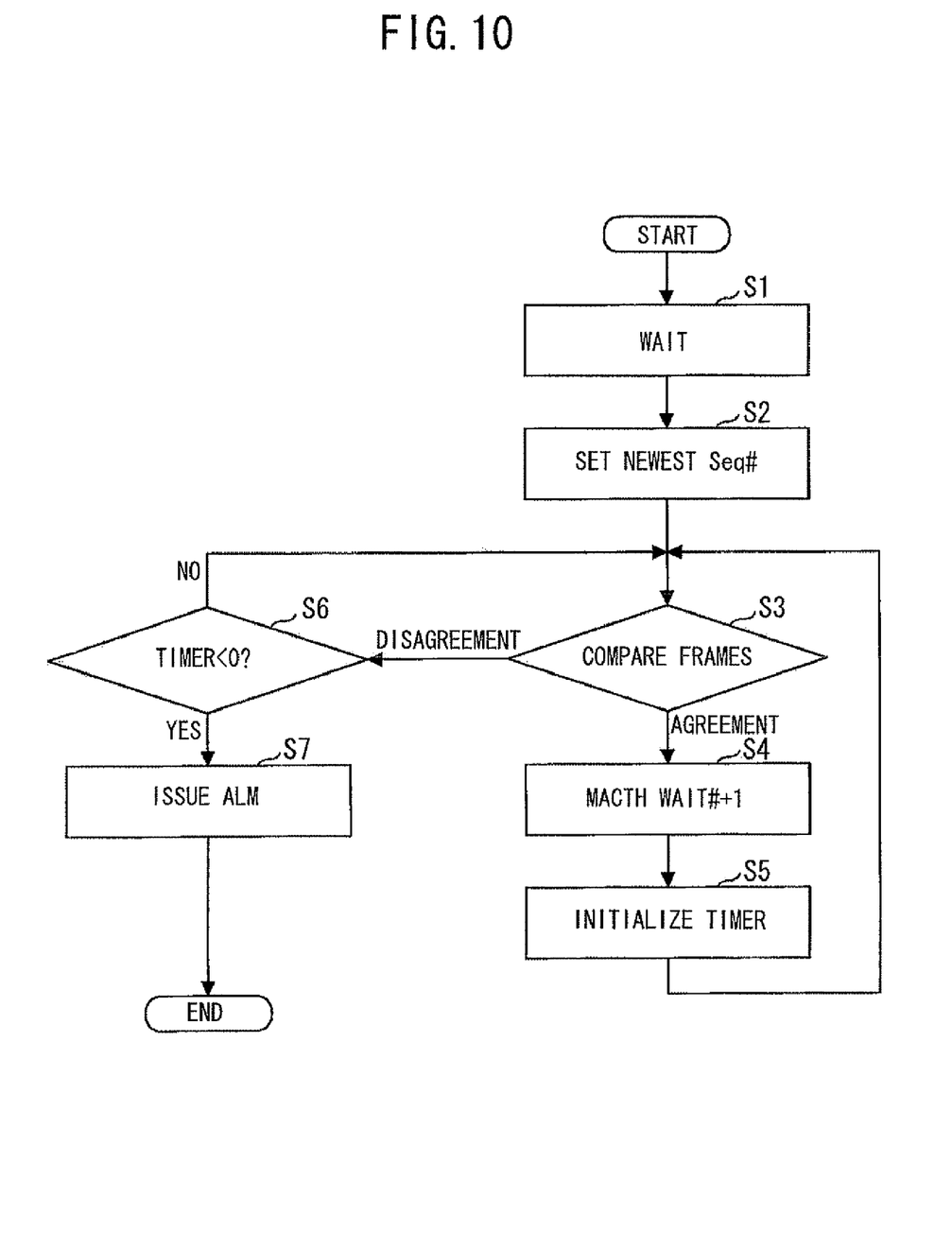
FIG. 10 is a flow chart of an abnormality detection process.

FIG. 10 shows a flow chart of an abnormality detection process executed by the comparison function portion 28d. This process is started by any of the start or reset of the apparatus, or the return of a physical interface from the LinkDown thereof.

Referring to FIG. 10, the comparison function portion 28d waits for a predetermined time (for example, a several seconds) for signal stabilization from the LinkDown restoration in operation S1. In operation S2, larger one between the maximum value of the sequence number stored in the working frame buffer 29a at the time and the maximum value of the sequence number stored in the protection frame buffer 29b at the time is set to a variable MACTHWAIT# as a newest sequence number In operation S3, an entire content of an intra-apparatus frame whose sequence number agrees with the MACTHWAIT# in the working frame buffer 29a is compared with an entire content of an intra-apparatus frame whose sequence number agrees with the MACTHWAIT# in the protection frame buffer 29b. In operation S3, predetermined items (for example, data portions) may be compared with each other for both the intra-apparatus frames.

In a case of agreement in the above comparison, the MACTHWAIT# is incremented by one to obtain a sequence number to be compared next time in operation S4. In operation S5, a timer is initialized. The process proceeds to operation S3 where intra-apparatus frames of the next sequence number are compared with each other. Here, the timer is a timer value counted down from an initial value N with time, and a value exceeding an acceptable value of the phase difference (time difference) between the working system and the protection system is set to the initial value N.

In a case of disagreement in the above comparison, it is determined whether the timer is timed out or not in operation S6. When the timer is not timed out, the process proceeds to operation S3 where the frame comparison is continued again. On the other hand, when the timer is timed out, the alarm function portion 28c is reported to that effect in operation S7.

The above comparison between the intra-apparatus frames having the same sequence number can determine that an error has occurred in either of the working system and the protection system.

A ping frame is transmitted from the frame transmission/reception function portion 28a of the CPU (supervision control unit) 28 of the switch apparatus 20 to the CPU (supervision control unit) 18 by, for example, the path of the working system (the path of the switch section 23, the ingress section 21, the egress section 14 of the switch apparatus 10, and the switch section 13). A ping response frame is received by a path which is reverse to the above path, whereby the ping connectivity check of the path of the working system is performed. It is apparent that the ping frame may be transmitted to the path of the protection system, and that the ping response frame may be received by the reversed path thereof.

With this check, it can be determined that the path of the protection system has an abnormality when there is no abnormality in the path of the working system, and there is an alarm by the frame comparison. Thus, it becomes possible to determine the abnormality of the path of the protection system, and the occurrence of a silent alarm state can be avoided.

The alarm function portion 28c generates the respective alarms of the working system and the protection system and notifies the alarms to the NMS 51 via the supervision network 50. Thus, the alarms are reported to a maintenance engineer.

According to the above embodiments, any fault in the protection system in the 1+1 switching scheme can be reliably detected, and the occurrence of a silent alarm state can be prevented.

In the above embodiments, although the connectivity check is performed by using the ping frame, another frame such as an operation, administration, and management (OAM) frame may be used instead of the ping frame.

In the above embodiments, the frame transmission/reception function portion 18a is used as an example of a supervising-frame transmitting unit, the ingress section 31 and the switch section 33 are used as an example of a working supervising-frame filter unit, the ingress section 32 and the switch section 33 are used as an example of a protection supervising-frame filter unit, the frame transmission/reception function portion 18a is used as an example of a connectivity check unit, the signal processing unit 11b is used as an example of a sequence number adding unit, the frame buffer 29 is used as an example of a storing unit, the comparison function portion 28d is used as an example of a comparison unit, and the frame transmission/reception function portions 18a and 28a are used as an example of a supervising-frame transmitting and receiving unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:
1. A redundancy method in which a network is made redundant with a working path and a protection path, comprising:
   transmitting a working system supervising frame and a protection system supervising frame from a switch apparatus on a transmission side to the working path and the protection path;
   passing, by a switch apparatus on reception side, the working system supervising frame received from the working path as well as abolishing the protection system supervising frame and passing the protection system supervising frame received from the protection path as well as abolishing the working supervising frame; and
   performing a connectivity check for the working path and the protection path by using the passed working system supervising frame and the passed protection system supervising frame.

2. A redundancy method in which a network is made redundant with a working path and a protection path, comprising:
   adding a sequence number to a frame to be transmitted from a switch apparatus on transmission side and transmitting the frame to the working path and the protection path;
   storing, by a switch apparatus on reception side, a plurality of frames received from the working path and a plurality of frames received from the protection path into a buffer independently; and
   comparing contents of frames having the same sequence number among the plurality of frames received from the working path and stored in the buffer and the plurality of frames received from the protection path and stored in the buffer to detect a fault of the working path and the protection path.

3. The redundancy method according to claim 2, wherein a working system supervising frame or a protection system supervising frame is transmitted and received between the switch apparatus on the transmission side and the switch apparatus on the reception side by the working path or the protection path.

4. A switch apparatus constituting a network, comprising:
   a working system supervising-frame filter for passing a working system supervising frame received from a working path as well as abolishing a protection system supervising frame;
   a protection system supervising-frame filter for passing a protection system supervising frame received from a protection path as well as abolishing the working system supervising frame; and a connectivity check unit for performing a connectivity check for the working path and the protection path by using the passed working system supervising frame and the passed protection system supervising frame.

5. The switch apparatus according to claim 4, further comprising
a supervising-frame transmitting unit for transmitting the working system supervising frame and the protection system supervising frame to the working path and the protection path.

6. A switch apparatus constituting a network, comprising:
a sequence number adding unit for adding a sequence number to a frame to be transmitted and transmitting the frame to a working path and a protection path;
a storage for independently storing a frame received from the working path and added with the sequence number and a frame received from the protection path and added with the sequence number; and
a comparing unit for comparing contents of frames having the same sequence number between the frame received from the working path and stored in the storage and the frame received from the protection path and stored in the storage to detect a fault of the working path and the protection path.

7. The switch apparatus according to claim 6, further comprising
a supervising-frame transmitting and receiving unit for transmitting and receiving a working system supervising frame or a protection system supervising frame by the working path or the protection path.

* * * * *